United States Patent
Miura et al.

(10) Patent No.: US 9,503,962 B2
(45) Date of Patent: Nov. 22, 2016

(54) MOBILE WIRELESS DEVICE

(71) Applicant: Panasonic Intellectual Property Management Co., Ltd., Osaka (JP)

(72) Inventors: Tooru Miura, Ishikawa (JP); Hiroyuki Uejima, Ishikawa (JP); Takenobu Arima, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/849,442

(22) Filed: Sep. 9, 2015

(65) Prior Publication Data

US 2016/0135113 A1 May 12, 2016

(30) Foreign Application Priority Data

Nov. 6, 2014 (JP) .................. 2014-226229

(51) Int. Cl.
*H04W 40/28* (2009.01)
*H04B 7/04* (2006.01)
*H04W 88/02* (2009.01)

(52) U.S. Cl.
CPC ........... *H04W 40/28* (2013.01); *H04B 7/0404* (2013.01); *H04W 88/02* (2013.01)

(58) Field of Classification Search
CPC ............................. H01Q 1/24; H04W 40/28
See application file for complete search history.

(56) References Cited

U.S. PATENT DOCUMENTS

2013/0033996 A1* 2/2013 Song .................. H04B 7/0808 370/252

FOREIGN PATENT DOCUMENTS

| JP | 2004-135054 | * | 4/2004 | ............... H01Q 1/24 |
| JP | 2011-160201 | | 8/2011 | |

* cited by examiner

*Primary Examiner* — Tuan H Nguyen
(74) *Attorney, Agent, or Firm* — Seed IP Law Group LLP (57) ABSTRACT

A mobile wireless device includes a first microphone that receives an audio signal, a plurality of antennas disposed at different distances from the first microphone, a wireless unit that performs wireless signal processing for signals received/transmitted through the antennas, an antenna switch that is connected to the wireless unit and performs antenna switching to connect one of the plurality of antennas to the wireless unit, an audio signal processor that processes the audio signal, and a main body that is wearable and includes the wireless unit, the first microphone, the antenna switch, the audio signal processor, and at least one of the antennas. The audio signal processor calculates a level of the audio signal. The antenna switch performs the antenna switching based on the level of the audio signal to switch to one of the antennas that is anticipated to provide better performance.

16 Claims, 10 Drawing Sheets

MOBILE WIRELESS DEVICE

BACKGROUND

1. Technical Field

The present disclosure relates to a mobile wireless device in which antenna switching is performed.

2. Description of the Related Art

Mobile wireless devices including a plurality of switchable antennas have been developed to have improved communication quality through antenna switching.

Japanese Unexamined Patent Application Publication No. 2004-135054 discloses a mobile phone that determines if the antenna receives audio signals representing speech sounds of a person on the other end of the phone or data signals to confirm an operation mode of the mobile phone, and performs antenna switching based on the determination.

Japanese Unexamined Patent Application Publication No. 2011-160201 discloses a mobile wireless device that determines an opening state of a foldable chassis or an opening angle of the chassis to confirm which one of a voice call function and an internet connection function is being used, and performs antenna switching based on the determination.

Wearable devices including mobile wireless devices have recently been developed. The mobile wireless device is used while being partly in contact with the user's body. Here, a configuration of a wristwatch mobile wireless device that includes a main body, a microphone mounted in the main body, and an antenna element adjacent to the main body is discussed. In such a configuration, when the user uses the microphone, the antenna is positioned between the user's wrist and head. This causes the antenna performance to deteriorate. Such an effect on the antenna performance is referred to as a head proximity effect throughout the specification.

In order to reduce the head proximity effect in the wearable mobile wireless device, the microphone may be disposed on a component other than the main body to separate the microphone from the antenna element. However, if the microphone is remote from the main body, the user needs to confirm the position of the microphone before use, which may be inconvenient to the user.

Alternatively, in order to reduce the head proximity effect in the wearable mobile wireless device, the antenna element may be disposed on a component other than the main body to separate the microphone from the antenna element. However, if the antenna element is remote from the main body, a cable such as a coaxial cable is required to connect the antenna element and the main body to each other. This causes the antenna performance to deteriorate due to cable loss.

The above-described conventional technologies that are disclosed in Japanese Unexamined Patent Application Publications Nos. 2004-135054 and 2011-160201 do not solve the problem relating to the head proximity effect in the wearable mobile wireless device. The technology disclosed in Japanese Unexamined Patent Application Publication No. 2004-135054 detects the audio signals from a person on the other end of the phone for the antenna switching. It is impossible to know whether or not the head of the mobile phone user is positioned close to the mobile phone. In addition, the mobile phone and the wearable mobile wireless device are used in different ways. The technology disclosed in Japanese Unexamined Patent Application Publication No. 2011-160201 determines the opening state of a foldable chassis or the opening angle of a chassis to confirm which one of the voice call function and the internet connection function is being used. Thus, this technique cannot be used to solve the problem relating to the head proximity effect in the wearable mobile wireless device.

SUMMARY

One non-limiting and exemplary embodiment provides a mobile wireless device that is wearable, in which a deterioration in antenna performance due to the head proximity effect is reduced.

In one general aspect, the techniques disclosed here feature a mobile wireless device. The mobile wireless device includes a first microphone that receives an audio signal, a plurality of antennas disposed at different distances from the first microphone, a wireless unit that performs wireless signal processing for signals received/transmitted through the antennas, an antenna switch that is connected to the wireless unit and performs antenna switching to connect one of the plurality of antennas to the wireless unit an audio signal processor that processes the audio signal, and a main body that is wearable, and includes the wireless unit, the first microphone, the antenna switch, the audio signal processor, and at least one of the antennas. The audio signal processor calculates a level of the audio signal and the antenna switch performs the antenna switching based on the level of the audio signal for switching to one of the antennas that is anticipated to provide better performance.

According to an aspect of the present disclosure, proper antenna switching is performed due to the detection of the proximity of the head.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure are described in detail with reference to the drawings. The embodiments described below are merely examples, and the present disclosure should not be limited thereto.

First Embodiment

Figure 1:
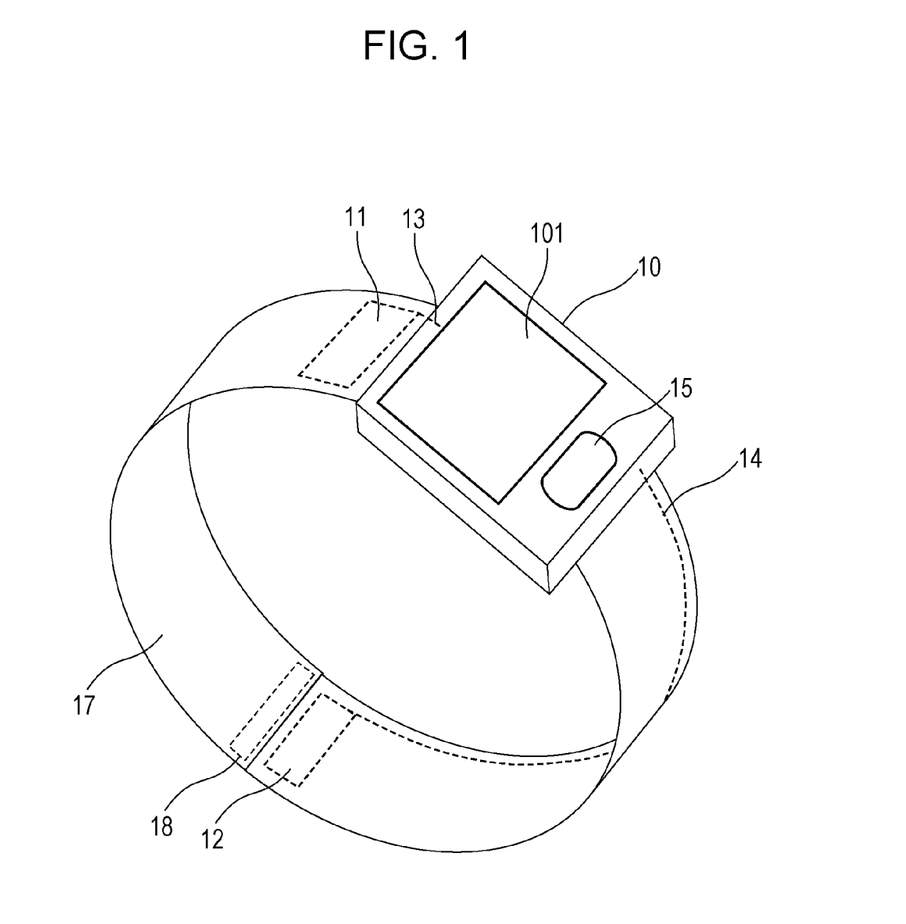
FIG. 1 is a view illustrating a general application of a mobile wireless device according to a first embodiment of the present disclosure.

FIG. 1 is a view illustrating a general application of a mobile wireless device according to a first embodiment of the present disclosure. In the first embodiment, a mobile wireless device in a form of a wristwatch is described as an example of the general application, but the present disclosure is not limited thereto.

As illustrated in FIG. 1, the mobile wireless device includes a main body 10, a first antenna 11, a second antenna 12, a first coaxial cable 13, a second coaxial cable 14, a belt 17, and a buckle 18.

The main body 10 is formed of a resin, for example, and includes a first microphone 15 and a display 101, for example. The first microphone 15 receives audio signals from a user. The specific configuration of the main body 10 is described later.

The belt 17 is formed of a resin, for example, and extends from ends of the main body 10. The belt 17 and the main body 10 form the form of the wristwatch. Ends of the belt 17 that are remote from the main body 10 are connected by the buckle 18.

The first antenna 11 is adjacent to the main body 10 on the belt 17. The first antenna 11 may be connected to the main body 10 through the low-loss first coaxial cable 13. Alternatively, the first antenna 11 may be mounted in the main body 10.

The second antenna 12 is adjacent to the buckle 18 on the belt 17. In other words, the second antenna 12 is remote from the main body 10 and the first microphone 15. The second antenna 12 is connected to the main body 10 through the low-loss second coaxial cable 14.

The second antenna 12 requires a longer coaxial cable than the first antenna 11 to be connected to the main body 10. Thus, the second antenna 12 is likely to have larger cable loss than the first antenna 11, and the performance of the second antenna 12 may deteriorate more than that of the first antenna 11. If the first antenna 11 is mounted in the main body 10, the difference in the antenna performance between the first antenna 11 and the second antenna 12 becomes larger.

Figure 2:
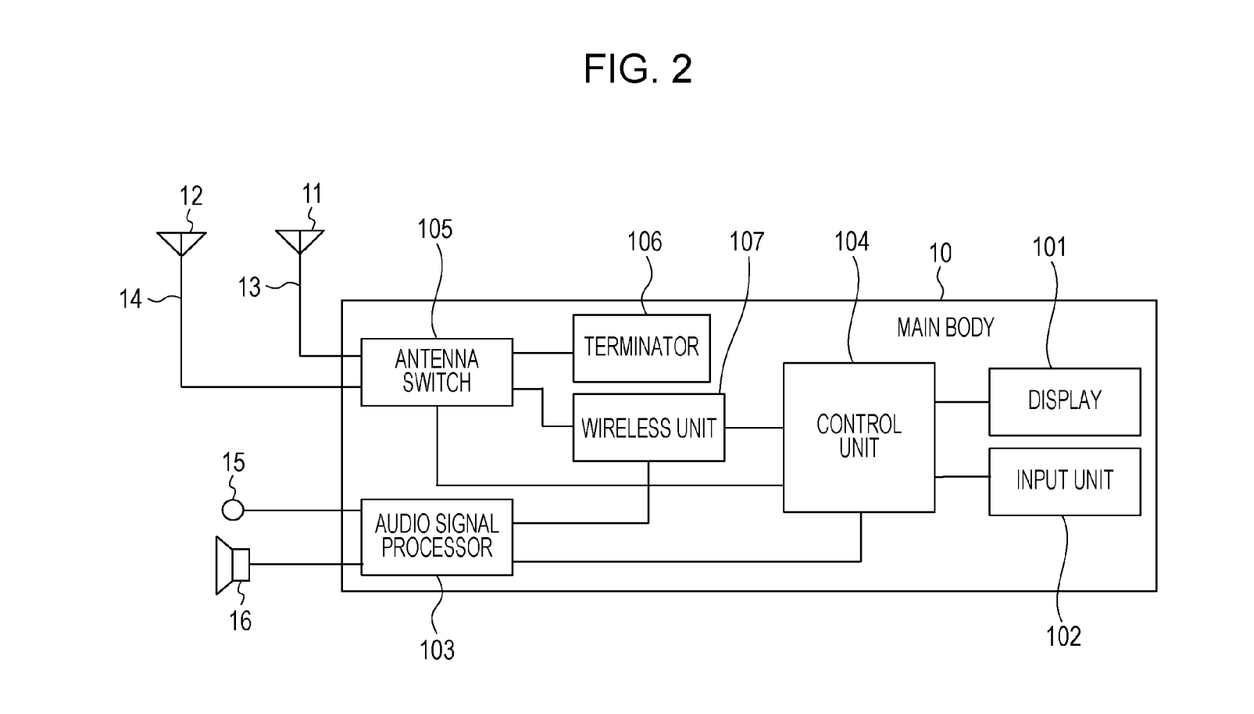
FIG. 2 is a configuration diagram of main components of the mobile wireless device according to the first embodiment of the present disclosure.

Next, main components of the mobile wireless device of the first embodiment are described with reference to FIG. 2. FIG. 2 is a diagram showing main components of the mobile wireless device according to the first embodiment of the present disclosure.

The mobile wireless device in FIG. 2 includes the main body 10, the first antenna 11, the second antenna 12, the first coaxial cable 13, the second coaxial cable 14, the first microphone 15, and a speaker 16. The first microphone 15 may be included in the main body 10.

The main body 10 includes the display 101, an input unit 102, an audio signal processor 103, a control unit 104, an antenna switch 105, a terminator 106, and a wireless unit 107.

The display 101 is a display device such as a liquid crystal display. The display 101 is configured to display under control of the control unit 104.

The input unit 102 is an input device such as a touch panel or a key pad. The input unit 102 receives information input by a user and outputs the received information to the control unit 104.

The audio signal processor 103 is connected to the first microphone 15, the speaker 16, the control unit 104, and the wireless unit 107. The audio signal processor 103 processes the audio signals received by the first microphone 15 so as to be output to the speaker 16 under the control of the control unit 104.

In addition, the audio signal processor 103 calculates a level of an audio signal received by the first microphone 15 and compares the calculated level of the audio signal with a predetermined threshold. The audio signal processor 103 outputs to the control unit 104 a judgment signal representing the comparison result, i.e., whether or not the level of the audio signal received by the first microphone 15 is higher than the predetermined threshold.

The antenna switch 105 is connected to the first antenna 11 and the second antenna 12 through the first coaxial cable 13 and the second coaxial cable 14, respectively. The antenna switch 105 is configured to selectively connect the first antenna 11 and the second antenna 12 to the wireless unit 107 and the terminator 106 under the control of the control unit 104.

Specifically, the antenna switch 105 may connect the first antenna 11 to the wireless unit 107 and connect the second antenna 12 to the terminator 106. Alternatively, the antenna switch 105 may connect the first antenna 11 to the terminator 106 and connect the second antenna 12 to the wireless unit 107.

When the mobile wireless device is in a standby mode, the antenna switch 105 connects the first antenna 11 and the second antenna 12 to the wireless unit 107 and the terminator 106, respectively.

The wireless unit 107 is connected to one of the first antenna 11 and the second antenna 12 by the antenna switch 105. The wireless unit 107 is also connected to the control unit 104. The wireless unit 107 is configured to perform wireless signal processing such as modulation and demodulation of signals transmitted through the antennas, for example, under the control of the control unit 104.

The terminator 106 is provided to prevent the antenna connected to the terminator 106 from having an influence on the antenna connected to the wireless unit 107. The terminator 106 is connected to one of the first antenna 11 and the second antenna 12 that is not connected to the wireless unit 107 by the antenna switch 105. Specifically, the terminator 106 is set such that the impedance thereof from an antenna end is open impedance.

The control unit 104 is connected to the display 101, the input unit 102, the audio signal processor 103, the antenna switch 105, and the wireless unit 107. The control unit 104 controls an image on the display 101, information received at the input unit 102, the processing of the audio signals at the audio signal processor 103, and the wireless signal processing at the wireless unit 107.

When the mobile wireless device is in a standby mode, the control unit 104 directs the antenna switch 105 to connect the first antenna 11 and the second antenna 12 to the wireless unit 107 and the terminator 106, respectively.

The control unit 104 receives the judgment signal from the audio signal processor 103. The control unit 104 controls the antenna switching performed by the antenna switch 105 based on the judgment signal representing whether or not the level of the audio signal received by the first microphone 15 is higher than the predetermined threshold.

Specifically, if the level of the audio signal is higher than the predetermined threshold, the control unit 104 directs the antenna switch 105 to connect the first antenna 11 and the second antenna 12 to the terminator 106 and the wireless unit 107, respectively.

If the level of the audio signal is lower than the predetermined threshold, the control unit 104 directs the antenna switch 105 to connect the second antenna 12 and the first antenna 11 to the terminator 106 and the wireless unit 107, respectively.

Figure 3A:
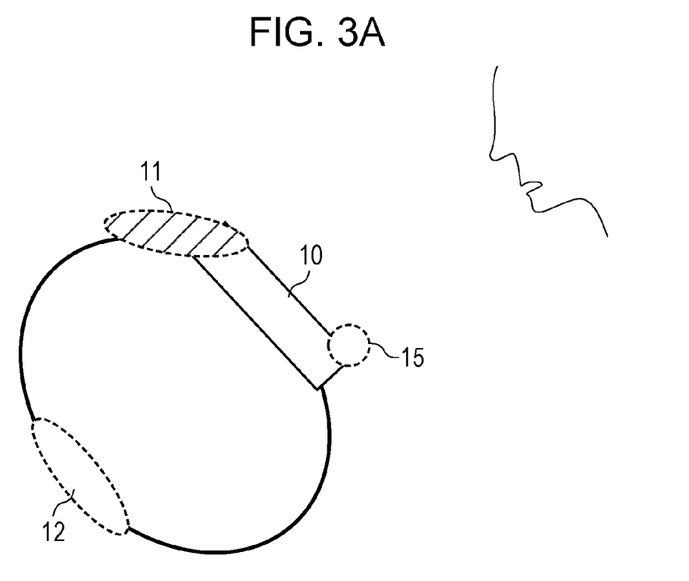
FIGS. 3A and 3B are comparative views illustrating use states of the mobile wireless device according to the first embodiment of the present disclosure.
Figure 3B:
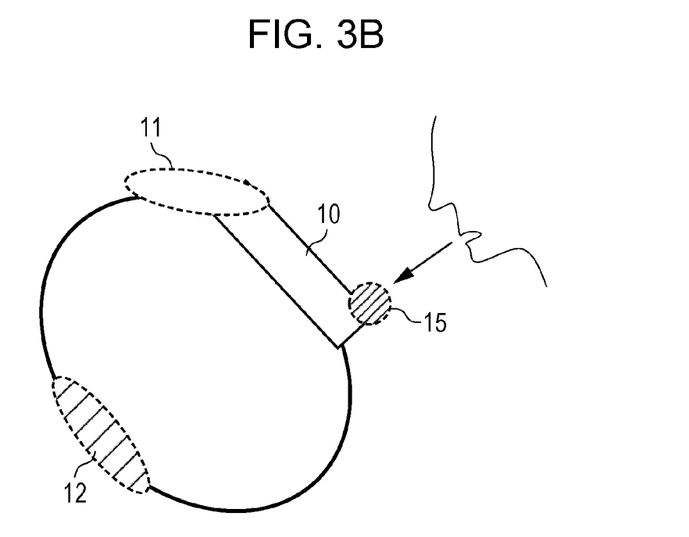

The antenna switching by the antenna switch 105 is described with reference to FIGS. 3A and 3B. FIGS. 3A and 3B are comparative views illustrating use states of the mobile wireless device according to the first embodiment of the present disclosure. The mobile wireless device that is in the form of a wristwatch is worn on a user's arm or wrist, for example. The mobile wireless device and the user's head are typically positioned relative to each other as illustrated in examples in FIG. 3A and FIG. 3B.

In a state as illustrated in FIG. 3A, the mobile wireless device is not used for a voice call or is in the standby mode, and the user's head is not close to the mobile wireless device. In such a state, the second antenna 12 and the first antenna 11 are connected to the terminator 106 and the wireless unit 107, respectively by the antenna switch 105, as indicated in FIG. 3A.

In the state illustrated in FIG. 3A, for example, if the user moves his/her head toward the first microphone 15 and speaks, the head is too close to the first antenna 11 connected to the wireless unit 107, and the antenna performance deteriorates due to the head proximity effect.

Then, in the mobile wireless device, the antenna switching is performed to shift the state in FIG. 3A to the state in FIG. 3B based on the audio signal received by the first microphone 15.

Specifically, when the user moves his/her head toward the first microphone 15 and speaks on the phone for a voice call, the first microphone 15 receives the audio signal from the user and outputs the received audio signal to the audio signal processor 103.

The audio signal processor 103 calculates the level of the audio signal received by the first microphone 15 and compares the calculated level of the audio signal with the predetermined threshold. The audio signal processor 103 outputs to the control unit 104 the judgment signal representing the comparison result, i.e., whether or not the level of the audio signal received by the first microphone 15 is higher than the predetermined threshold.

If the level of the audio signal is higher than the predetermined threshold, the control unit 104 directs the antenna switch 105 to connect the first antenna 11 and the second antenna 12 to the terminator 106 and to the wireless unit 107, respectively.

FIG. 3B illustrates a state after the antenna switching by the antenna switch 105. In the state illustrated in FIG. 3B, the mobile wireless device is used for the voice call and the user's head is close to the main body 10 of the mobile wireless device. In such a state, the first antenna 11 and the second antenna 12 are connected to the terminator 106 and to the wireless unit 107, respectively by the antenna switch 105, as indicated in FIG. 3B.

As described above, in the first embodiment, the antenna switching is performed based on the level of the audio signal received by the first microphone 15. The antenna switching prevents the deterioration in the antenna performance due to the head proximity effect and enables switching to one of the antennas that is anticipated to provide better performance.

In addition, the user does not need to be concerned about the position of the microphone. An identical function to that in the first embodiment can be obtained by a proximity sensor, for example, that detects the presence of the head nearby. However, the first embodiment is available at a much lower cost than the proximity sensor, for example.

Second Embodiment

Figure 4:
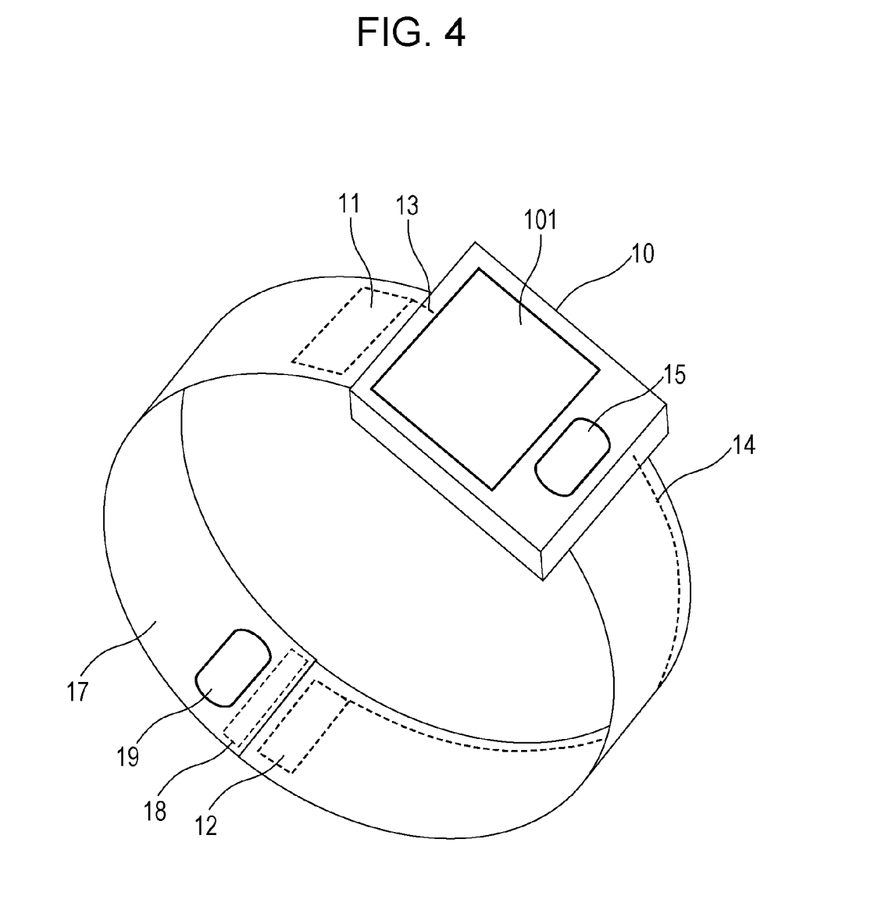
FIG. 4 is a view illustrating a general application of a mobile wireless device according to a second embodiment of the present disclosure.

A second embodiment includes two microphones to reduce the deterioration in the antenna performance due to the head proximity effect. FIG. 4 is a view illustrating a general application of the mobile wireless device according to the second embodiment of the present disclosure. In FIG. 4, components identical to those in FIG. 1 are assigned the same reference numerals as those in FIG. 1 and are not described in detail.

The mobile wireless device illustrated in FIG. 4 includes a second microphone 19 in addition to the components of the mobile wireless device according to the first embodiment illustrated in FIG. 1.

The first microphone 15 is included in the main body 10 as in the first embodiment. In other words, the first microphone 15 is adjacent to the first antenna 11 as in the first embodiment.

The second microphone 19 is adjacent to the buckle 18 or the second antenna 12. The second microphone 19 receives the audio signals from the user as the first microphone 15.

The mobile wireless device of the second embodiment includes the first microphone 15 and the second microphone 19 that are adjacent to the first antenna 11 and the second antenna 12, respectively. This configuration enables a comparison between the level of the first audio signal received by the first microphone 15 and the level of the second audio signal received by the second microphone 19 to determine which one of the first antenna 11 and the second antenna 12 is closer to the user's head.

Figure 5:
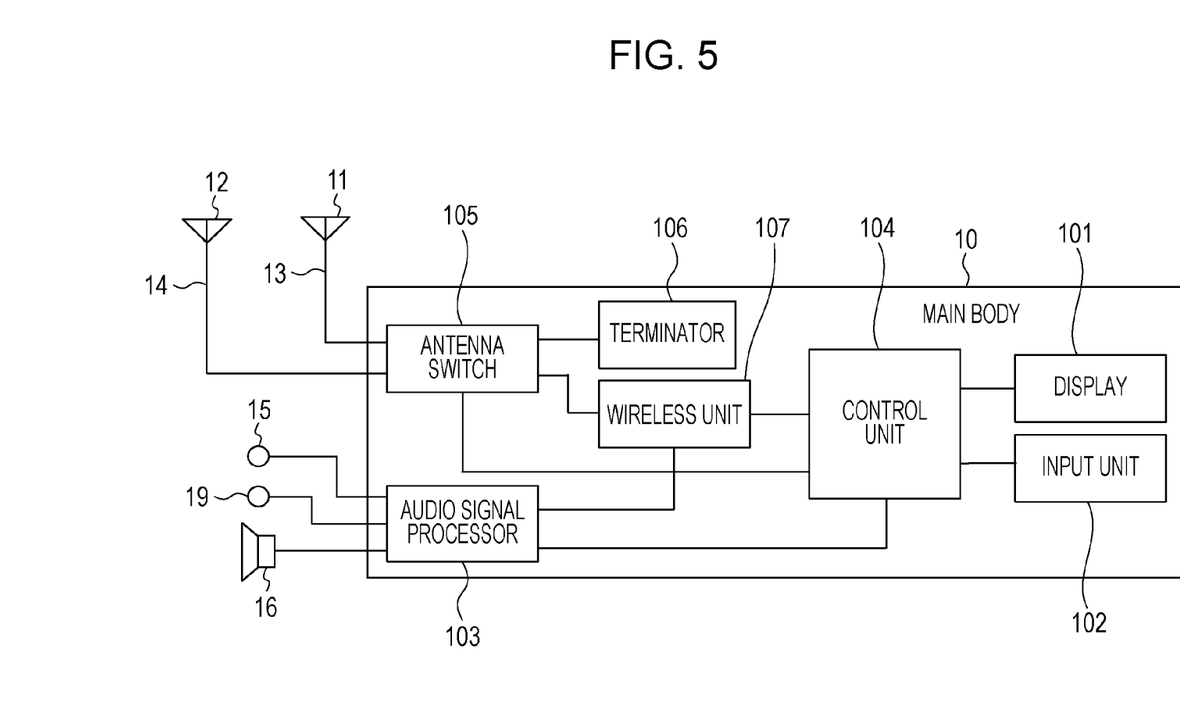
FIG. 5 is a configuration diagram of main components of the mobile wireless device according to the second embodiment of the present disclosure.

Main components of the mobile wireless device of the second embodiment are described with reference to FIG. 5. FIG. 5 is a configuration diagram of the main components of the mobile wireless device according to the second embodiment of the present disclosure. In FIG. 5, components identical to those in FIG. 2 are assigned the same reference numerals as those in FIG. 2 and are not described in detail. The mobile wireless device of the second embodiment illustrated in FIG. 5 differs from the mobile wireless device of the first embodiment illustrated in FIG. 2 in which the second microphone 19 is additionally included and in which the functions of the audio signal processor 103 and the control unit 104 are different from those of the first embodiment.

Specifically, the audio signal processor 103 is connected to the first microphone 15, the second microphone 19, the speaker 16, the control unit 104, and the wireless unit 107. The audio signal processor 103 processes the audio signals received by the first microphone 15 and the second microphone 19 so as to be output to the speaker 16 under the control of the control unit 104.

The audio signal processor 103 calculates the level of a first audio signal received by the first microphone 15 and the level of a second audio signal received by the second microphone 19 and compares the calculated levels of the first audio signal and the second audio signal. The audio signal processor 103 outputs to the control unit 104 the comparison result, which is the judgment signal representing whether or not the level of the first audio signal is higher than the level of the second audio signal.

The control unit 104 receives the judgment signal from the audio signal processor 103. The control unit 104 controls the antenna switching performed by the antenna switch 105 based on the judgment signal representing whether or not the level of the first audio signal is higher than the level of the second audio signal.

Specifically, if the level of the first audio signal is higher than the level of the second audio signal, the control unit 104 directs the antenna switch 105 to connect the first antenna 11 and the second antenna 12 to the terminator 106 and the wireless unit 107, respectively.

If the level of the first audio signal is lower than the level of the second audio signal, the control unit 104 directs the antenna switch 105 to connect the second antenna 12 and the first antenna 11 to the terminator 106 and the wireless unit 107, respectively.

Figure 6A:
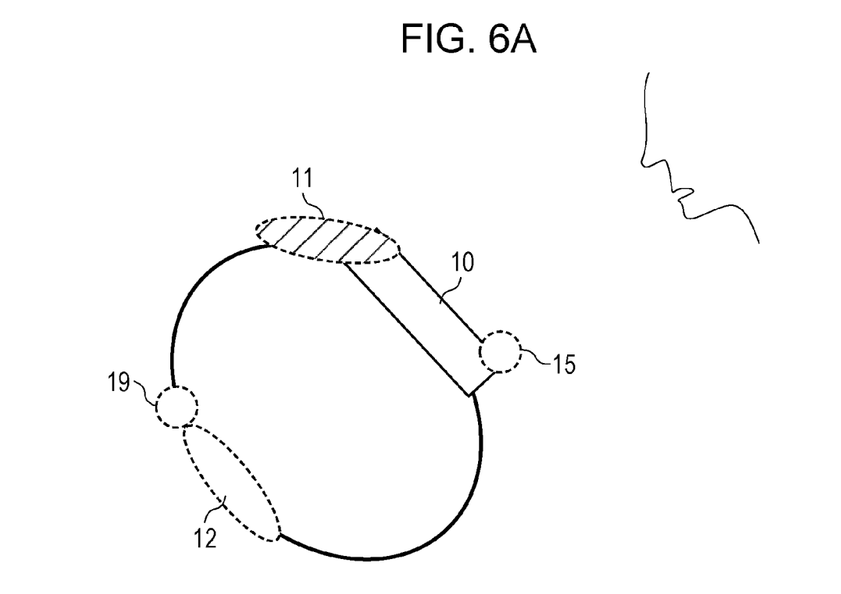
FIGS. 6A and 6B are comparative views illustrating use states of the mobile wireless device according to the second embodiment of the present disclosure.
Figure 6B:
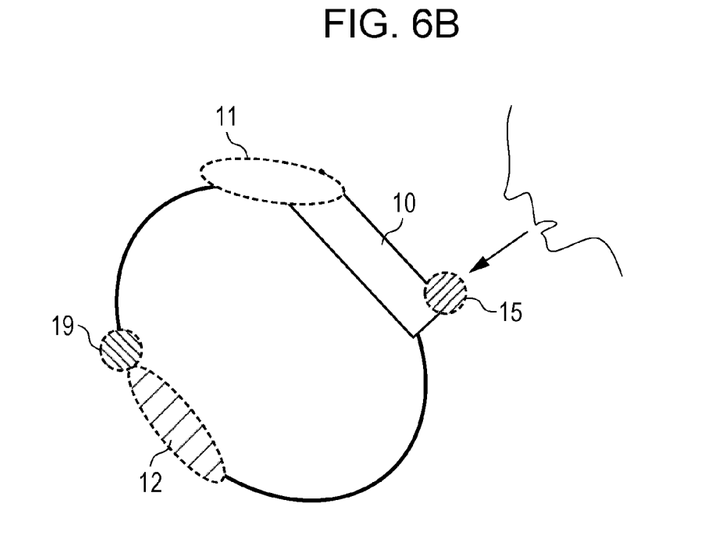

The antenna switching by the antenna switch 105 is described with reference to FIGS. 6A and 6B. FIGS. 6A and 6B are comparative views illustrating the use states of the mobile wireless device according to the second embodiment of the present disclosure. The mobile wireless device that is in the form of a wristwatch is worn on a user's arm or wrist, for example. The mobile wireless device and the user's head are typically positioned relative to each other as illustrated in examples in FIG. 6A and FIG. 6B.

In a state illustrated in FIG. 6A, the mobile wireless device is not used for the voice call or is in the standby mode, and the user's head is not close to the mobile wireless device. In such a state, the second antenna 12 and the first antenna 11 are connected to the terminator 106 and the wireless unit 107, respectively by the antenna switch 105, as indicated in FIG. 6A.

In the state illustrated in FIG. 6A, for example, if the user moves his/her head toward the first microphone 15 and speaks, the head is too close to the first antenna 11 connected to the wireless unit 107, and the antenna performance deteriorates due to the head proximity effect.

Then, the mobile wireless device performs the antenna switching to shift the state in FIG. 6A to the state in FIG. 6B based on the first audio signal received by the first microphone 15 and the second audio signal received by the second microphone 19.

Specifically, when the user moves his/her head toward the first microphone 15 and speaks on the phone (for the voice call), the first microphone 15 receives the first audio signal from the user and outputs the received first audio signal to the audio signal processor 103. In addition, the second microphone 19 remote from the first microphone 15 receives the second audio signal from the user and outputs the received second audio signal to the audio signal processor 103.

The audio signal processor 103 calculates the level of the first audio signal and the level of the second audio signal, and compares the calculated levels of the first and second audio signals. The audio signal processor 103 outputs to the control unit 104 the judgment signal representing the comparison result, i.e., whether or not the level of the first audio signal is higher than the second audio signal.

If the level of the first audio signal is higher than the level of the second audio signal, the control unit 104 directs the antenna switch 105 to connect the first antenna 11 and the second antenna 12 to the terminator 106 and the wireless unit 107, respectively.

FIG. 6B illustrates a state after the antenna switching by the antenna switch 105. In the state illustrated in FIG. 6B, the mobile wireless device is used for the voice call and the user's head is close to the main body 10 of the mobile wireless device. In such a state, the first antenna 11 and the second antenna 12 are connected to the terminator 106 and to the wireless unit 107, respectively by the antenna switch 105, as indicated in FIG. 6B.

As described above, in the second embodiment, the antenna switching is performed based on the level of the first audio signal received by the first microphone 15 and the level of the second audio signal received by the second microphone 19. This configuration enables more accurate determination of which one of the antennas is closer to the user's head. The antenna switching prevents the deterioration in the antenna performance due to the head proximity effect and enables switching to one of the antennas that is anticipated to provide better performance.

A configuration including two microphones at different two positions is widely used in smartphones, for example. One of the microphones receives audio signals and the other receives ambient noise to reduce noise in the audio signals. In such a configuration that includes two microphones, an additional microphone does not need to be provided to have the configuration in the second embodiment. The configuration in the second embodiment is available at a low cost.

Third Embodiment

Figure 7:
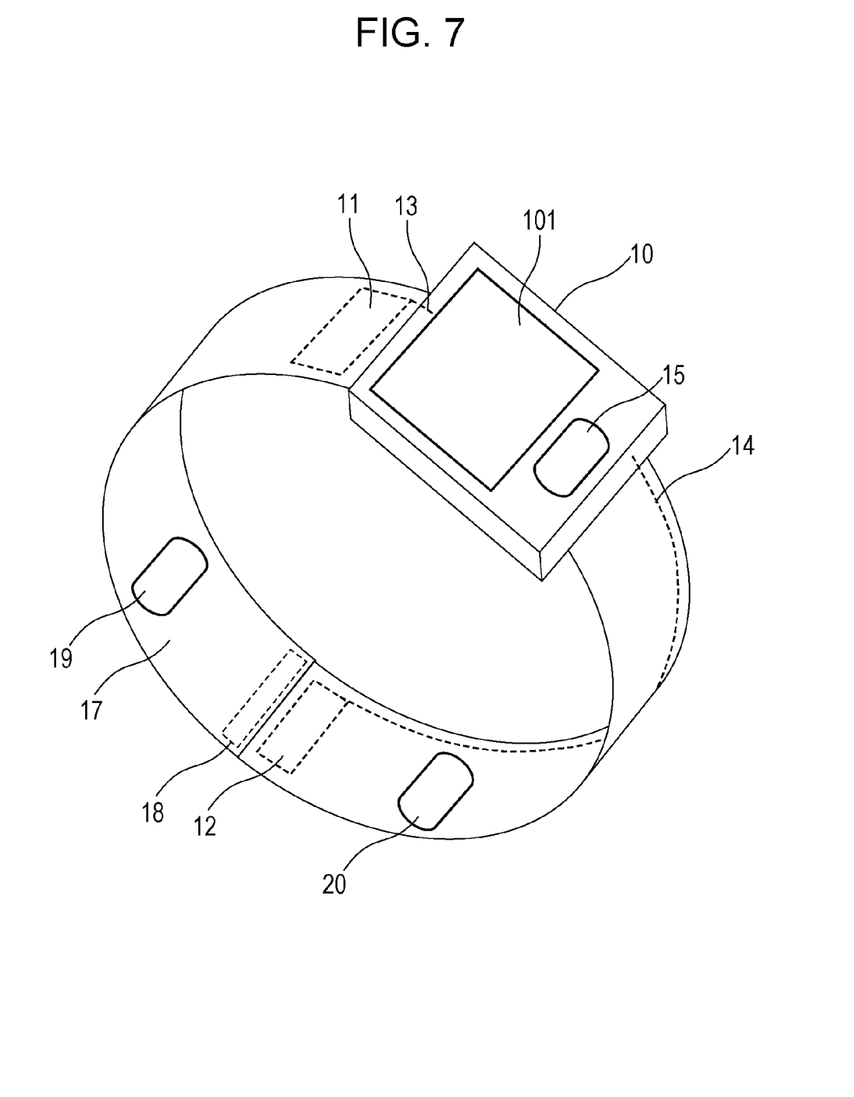
FIG. 7 is a view illustrating a general application of a mobile wireless device according to a third embodiment of the present disclosure.

A third embodiment includes a plurality of microphones to reduce the deterioration in the antenna performance due to the head proximity effect. FIG. 7 is a view illustrating a general application of the mobile wireless device according to the third embodiment of the present disclosure. In FIG. 7, components identical to those in FIG. 1 are assigned the same reference numerals as those in FIG. 1 and are not described in detail.

The mobile wireless device illustrated in FIG. 7 includes the second microphone 19 and a third microphone 20 in addition to the components of the mobile wireless device of the first embodiment illustrated in FIG. 1.

The first microphone 15 is included in the main body 10 as in the first embodiment. In other words, the first microphone 15 is adjacent to the first antenna 11 as in the first embodiment.

The first microphone 15, the second microphone 19, and the third microphone 20 are substantially equally positioned away from each other. In other words, a distance between the first microphone 15 and the second microphone 19, a distance between the first microphone 15 and the third microphone 20, and a distance between the second microphone 19 and the third microphone 20 are substantially equal.

In the mobile wireless device of the third embodiment, a position of the user's mouth, from which the audio signals output, i.e., a position of the user's head, is estimated using a first audio signal, a second audio signal, and a third audio signal received by the first microphone 15, the second microphone 19, and the third microphone 20, respectively to determine which one of the first antenna 11 and the second antenna 12 is closer to the user's head.

Figure 8:
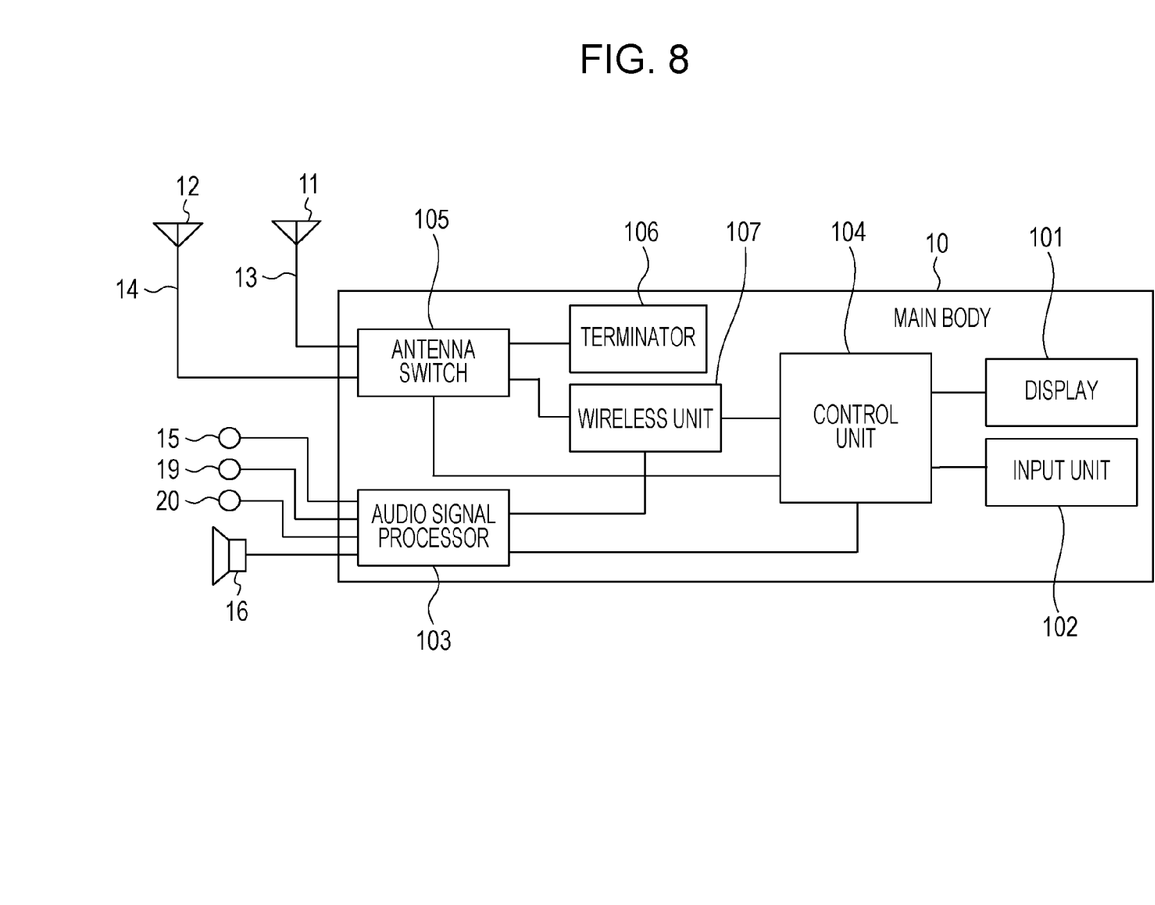
FIG. 8 is a configuration diagram of main components of the mobile wireless device according to the third embodiment of the present disclosure.

Main components of the mobile wireless device of the third embodiment are described with reference to FIG. 8. FIG. 8 is a configuration diagram of the main components of the mobile wireless device according to the third embodiment of the present disclosure. In FIG. 8, components identical to those in FIG. 2 are assigned the same reference numerals as those in FIG. 2 and are not described in detail. The mobile wireless device of the third embodiment illustrated in FIG. 8 differs from the mobile wireless device of the first embodiment illustrated in FIG. 2 in which the second microphone 19 and the third microphone 20 are additionally included, and the functions of the audio signal processor 103 and the control unit 104 are different from those of the first embodiment.

Specifically, the audio signal processor 103 is connected to the first microphone 15, the second microphone 19, the third microphone 20, the speaker 16, the control unit 104, and the wireless unit 107. The audio signal processor 103 processes the audio signals received by the first microphone 15, the second microphone 19, and the third microphone 20 so as to be output to the speaker 16 under the control of the control unit 104.

In addition, the audio signal processor 103 estimates the position of the user's mouth and head, which is a source of the audio signals, based on the levels or the difference of the levels of the first audio signal, the second audio signal, and the third audio signal received by the first microphone 15, the second microphone 19, and the third microphone 20, respectively.

Specifically, the audio signal processor 103 calculates a distance to the source of the audio signals based on the levels or the difference of the levels of the first, second, and third audio signals, for example, to estimate the position of the user's mouth and head. In other words, the audio signal processor 103 estimates the position of the head based on the general use state of the mobile wireless device and the position of the mouth.

The audio signal processor 103 outputs the estimation result, i.e., a signal representing the estimated position of the head to the control unit 104.

The control unit 104 receives the signal from the audio signal processor 103. The control unit 104 controls the antenna switching, which is performed by the antenna switch 105, based on the signal representing the estimated position of the head.

Specifically, if the estimated position of the head is determined to be close to the first antenna 11, the control unit 104 directs the antenna switch 105 to connect the first antenna 11 and the second antenna 12 to the terminator 106 and the wireless unit 107, respectively.

If the estimated position of the head is determined to be remote from the first antenna 11, the control unit 104 directs the antenna switch 105 to connect the second antenna 12 and the first antenna 11 to the terminator 106 and the wireless unit 107, respectively.

Figure 9A:
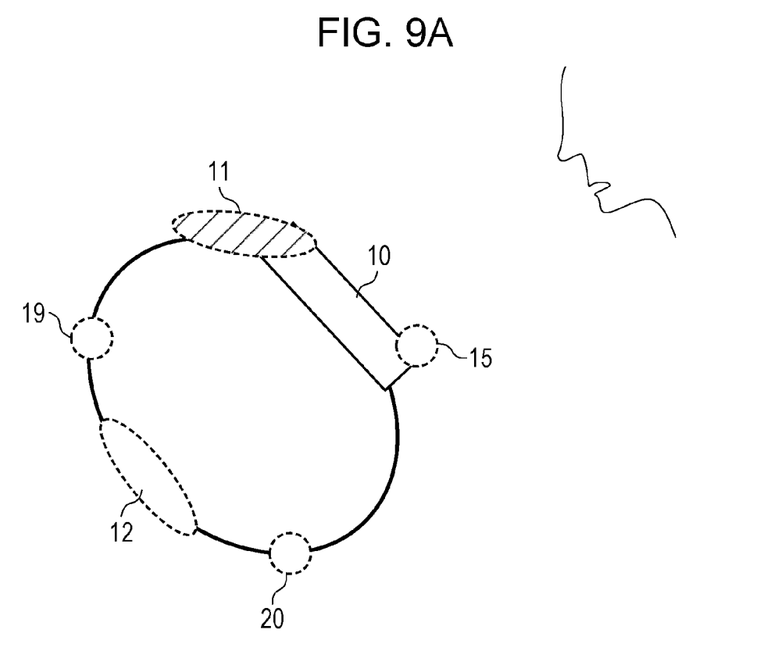
FIGS. 9A and 9B are comparative views illustrating use states of the mobile wireless device according to the third embodiment of the present disclosure.
Figure 9B:
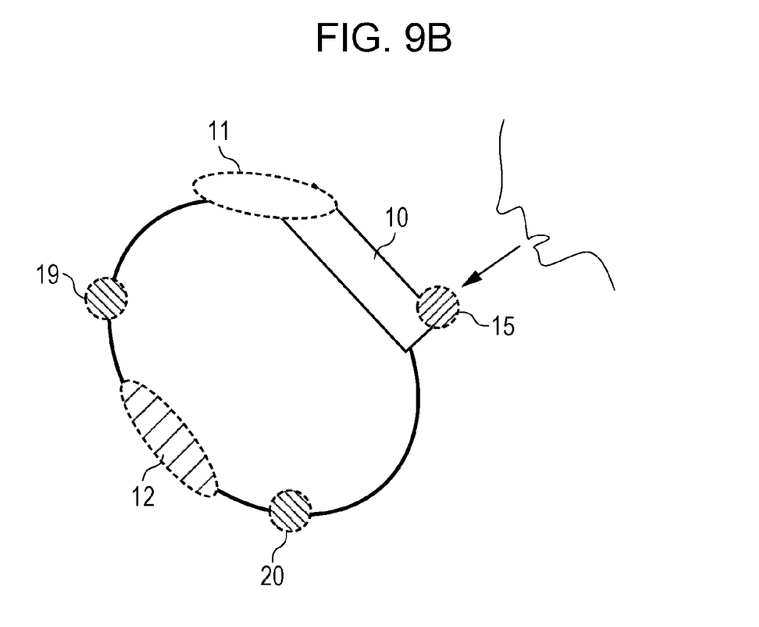

The antenna switching by the antenna switch 105 is described with reference to FIGS. 9A and 9B. FIGS. 9A and 9B are comparative views illustrating use states of the mobile wireless device according to the third embodiment of the present disclosure. The mobile wireless device that is in the form of a wristwatch is worn on a user's arm or wrist, for example. The mobile wireless device and the user's head are typically positioned relative to each other as illustrated in examples in FIG. 9A and FIG. 9B.

In a state illustrated in FIG. 9A, the mobile wireless device is not used for the voice call or is in the standby mode, and the user's head is not close to the mobile wireless device. In such a state, the second antenna 12 and the first antenna 11 are connected to the terminator 106 and the wireless unit 107, respectively by the antenna switch 105, as indicated in FIG. 9A.

In the state illustrated in FIG. 9A, for example, if the user moves his/her head toward to the first microphone 15 and speaks, the head is too close to the first antenna 11 connected to the wireless unit 107, and the antenna performance deteriorates due to the head proximity effect.

Then, in the mobile wireless device, the antenna switching is performed to shift the state in FIG. 9A to the state in FIG. 9B based on the first audio signal, the second audio signal, and the third audio signal received by the first microphone 15, the second microphone 19, and the third microphone 20, respectively.

Specifically, when the user moves his/her head toward the first microphone 15 and speaks on the phone (for the voice call), the first, second, and third microphones 15, 19, and 20 receive audio signals from the user as the first, second, and third audio signals, respectively, and output the received audio signals to the audio signal processor 103.

The audio signal processor 103 estimates the position of the user's mouth or head, which is a source of the audio signals, based on the first audio signal, the second audio signal, and the third audio signal received by the first microphone 15, the second microphone 19, and the third microphone 20, respectively.

The audio signal processor 103 outputs the estimation result, i.e., a signal representing the estimated position of the head to the control unit 104.

Specifically, if the estimated position of the head is determined to be close to the first antenna 11, the control unit 104 directs the antenna switch 105 to connect the first antenna 11 and the second antenna 12 to the terminator 106 and the wireless unit 107, respectively.

FIG. 9B illustrates a state after the antenna switching by the antenna switch 105. In the state illustrated in FIG. 9B, the mobile wireless device is used for the voice call and the user's head is close to the main body 10 of the mobile wireless device. In such a state, the first antenna 11 and the second antenna 12 are connected to the terminator 106 and to the wireless unit 107, respectively by the antenna switch 105, as indicated in FIG. 9B.

As described above, in the third embodiment, the position of the user's mouth or head, which is a source of the audio signals, is estimated based on the first audio signal, the second audio signal, and the third audio signal received by the first microphone 15, the second microphone 19, and the third microphones 20, respectively, and the antenna switching is performed based on the estimated position of the head. The antenna switching prevents the deterioration in the antenna performance due to the head proximity effect and enables switching to one of the antennas that is anticipated to provide better performance.

Figure 10:
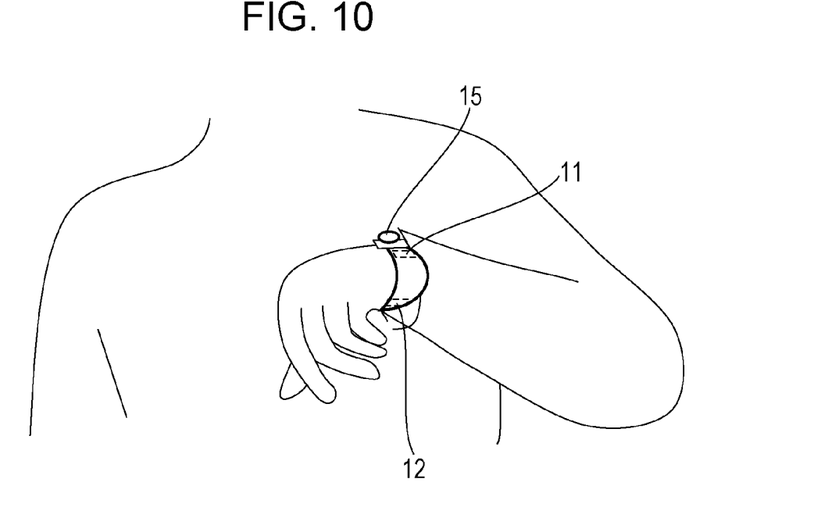
FIG. 10 is a view illustrating an example of how the mobile wireless device according to any one of the embodiments of the present disclosure is used.

FIG. 10 is a view illustrating an example of how the mobile wireless device in the form of a wristwatch according to any one of the embodiments of the present disclosure is used. As illustrated in FIG. 10, the mobile wireless device in the form of a wristwatch is worn on the user's wrist. The first microphone 15 of the mobile wireless device faces the user. The first antenna 11 is adjacent to the first microphone 15. The second antenna 12 is remote from the first microphone 15.

In the example illustrated in FIG. 10, switching between the first antenna 11 adjacent to the first microphone 15 and the second antenna 12 remote from the first microphone 15 is performed based on the level of the audio signal received by the first microphone 15. This prevents the deterioration in the antenna performance due to the head proximity effect and enables switching to one of the antennas that is anticipated to provide better performance.

The form of each embodiment of the present disclosure is not limited to the form of a wristwatch. The embodiments are applicable to any mobile wireless device having various wearable configurations. Specifically, another example of how the mobile wireless device is used is described with reference to FIG. 11, which is not in the form of a wristwatch illustrated in FIG. 10.

Figure 11:
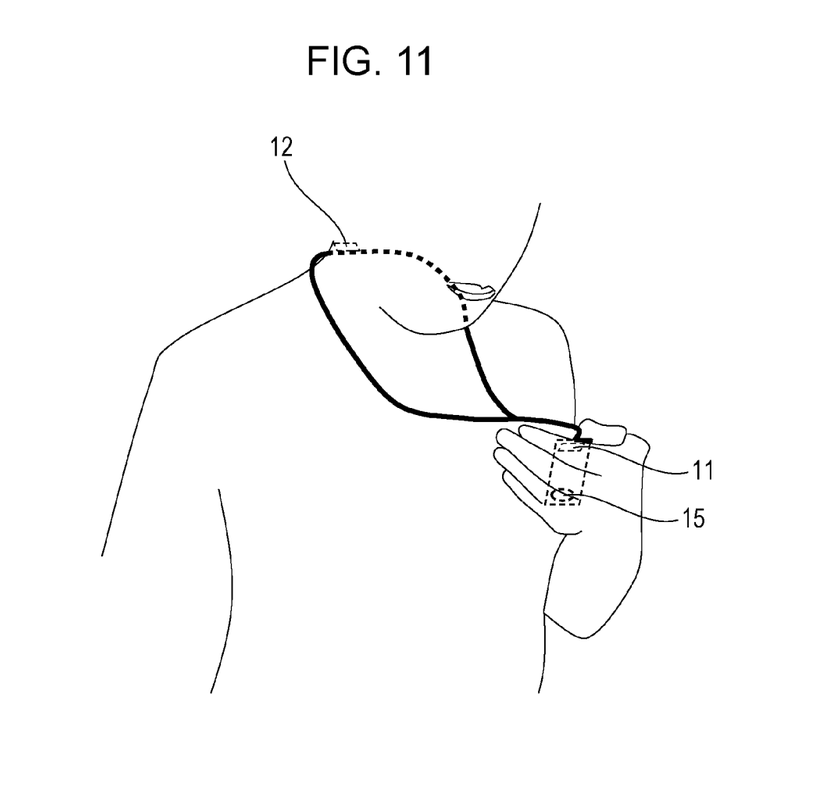
FIG. 11 is a view illustrating another example of how the mobile wireless device according to any one of the embodiments of the present disclosure is used.

FIG. 11 is a view illustrating another example of how the mobile wireless device of any one of the embodiments of the present disclosure is used. The mobile wireless device in FIG. 11 is a necklace mobile wireless device that is worn around the user's neck.

As illustrated in FIG. 11, the first microphone 15 faces the user when the user takes the mobile wireless device in his/her hand. The first antenna 11 is adjacent to the first microphone 15. The second antenna 12 is in a neck portion which is positioned around the user's neck. Specifically, the second antenna 12 is preferably positioned at a rear side of the neck portion remote from the user's neck.

In the example illustrated in FIG. 11, the switching between the first antenna 11 adjacent to the first microphone 15 and the second antenna 12 at the rear side of the neck portion remote from the user's neck is performed based on the level of the audio signal received by the first microphone 15. This prevents the deterioration in the antenna performance due to the head proximity effect and enables switching to one of the antennas that is anticipated to provide better performance.

The mobile wireless device of any one of the embodiments of the present disclosure is preferably applicable to a wearable mobile wireless device such as a wristwatch mobile wireless device.

What is claimed is:

1. A mobile wireless device comprising:
   a first microphone that receives an audio signal;
   a plurality of antennas disposed at different distances from the first microphone;
   a wireless unit that performs wireless signal processing for signals received/transmitted through the antennas;
   an antenna switch that is connected to the wireless unit and performs antenna switching to connect one of the plurality of antennas to the wireless unit;
   an audio signal processor that processes the audio signal received by the first microphone; and
   a main body that is wearable, and includes the wireless unit, the first microphone, the antenna switch, and the audio signal processor, wherein
      the audio signal processor calculates a level of the audio signal received by the first microphone, and
      the antenna switch performs the antenna switching to connect one of the plurality of antennas to the wireless unit based on the level of the audio signal received by the first microphone.

2. The mobile wireless device according to claim 1, wherein
   the plurality of antennas include a first antenna and a second antenna,
   the second antenna is positioned farther than the first antenna from the first microphone, and
   the antenna switch switches to the second antenna when the level of the audio signal is higher than a threshold.

3. The mobile wireless device according to claim 2, wherein the first antenna is included in the main body, and the second antenna is external to the main body.

4. The mobile wireless device according to claim 3, which is configured in a wristwatch form including the main body, a belt extending from ends of the main body, and a buckle positioned at ends of the belt remote from the main body, the second antenna is disposed in the buckle or on the belt at a position closer to the buckle than to the main body.

5. The mobile wireless device according to claim 2, wherein
   the first antenna and the second antenna are external to the main body, and
   the second antenna is positioned farther than the first antenna from the main body.

6. The mobile wireless device according to claim 1, further comprising a second microphone at a position remote from the first microphone, wherein
   the plurality of antennas include:
      a first antenna positioned closer to the first microphone than to the second microphone; and
      a second antenna positioned closer to the second microphone than to the first microphone, and
   the antenna switch compares the level of the audio signal received by the first microphone and an level of an audio signal received by the second microphone and switches to the second antenna if the level of the audio signal received by the first microphone is higher than the level of the audio signal received by the second microphone.

7. The mobile wireless device according to claim 1, further comprising a second microphone and a third microphone at positions remote from the first microphone, wherein
   the audio signal processor analyzes audio signals received by the first microphone, the second microphone, and the third microphone to estimate positions of a user's mouth and head, and
   the antenna switch switches to one of the plurality of antennas that is most remote from the position of the user's head as estimated by the audio signal processor.

8. The mobile wireless device according to claim 1, which is configured in a wristwatch form.

9. The mobile wireless device according to claim 1, which is configured in a necklace form.

10. A mobile wireless device comprising:
   a first microphone that receives a voice signal from a user;
   a second microphone that receives the voice signal from the user;
   a first antenna positioned closer to the first microphone than to the second microphone;
   a second antenna positioned closer to the second microphone than to the first microphone;
   a wireless unit that performs wireless signal processing for communication data received/transmitted through the first and the second antennas;
   an antenna switch that is connected to the wireless unit and performs antenna switching to connect one of the first and the second antennas to the wireless unit;
   an audio signal processor that processes the voice signal; and
   a main body that includes the wireless unit, at least one of the first and the second microphones, the antenna switch, and the audio signal processor, wherein the audio signal processor calculates a level of the voice signal received by the first microphone and a level of the voice signal received by the second microphone, the antenna switch connects the first antenna to the wireless unit in response to the level of the voice signal received by the first microphone being smaller than the voice signal received by the second microphone, and the antenna switch connects the second antenna to the wireless unit in response to the level of the voice signal received by the second microphone being smaller than the voice signal received by the first microphone.

11. The mobile wireless device according to claim 10, wherein the first antenna and the first microphone are included in the main body, and the second antenna and the second microphone are external to the main body.

12. The mobile wireless device according to claim 10, which is configured in a wristwatch form that includes a belt extending from ends of the main body and a buckle, wherein the second antenna is positioned closer to the buckle than to the main body.

13. The mobile wireless device according to claim 10, which is configured in a necklace form.

14. A method comprising:
receiving a first audio signal by a first microphone;
calculating a level of the first audio signal;
determining whether or not the level of the first audio signal is greater than a threshold;
coupling a first antenna to a wireless unit in response to determining that the level of the first audio signal is less than the threshold; and
coupling a second antenna to the wireless unit in response to determining that the level of the first audio signal is greater than the threshold, the first antenna being positioned a first distance from the first microphone, the second antenna being positioned a second distance from the first microphone, the second distance being larger than the first distance, the wireless unit being configured to perform wireless signal processing for signals received or transmitted through the first and second antennas.

15. The method of claim 14, further comprising:
receiving a second audio signal by a second microphone, the first antenna being positioned closer to the first microphone than to the second microphone, the second antenna positioned closer to the second microphone than to the first microphone; and
calculating a level of the second audio signal, the threshold being equal to the level of the second audio signal.

16. The method of claim 14, further comprising:
receiving a third audio signal by a third microphone;
determining a position of a user's head based on the first, second, and third audio signals; and
coupling the first antenna or the second antenna to the wireless unit based on the determined position of the user's head.

* * * * *